(12) United States Patent
Nishimura

(10) Patent No.: US 6,631,479 B1
(45) Date of Patent: Oct. 7, 2003

(54) DATA PROCESSING SYSTEM, DATA PROCESSOR AND DATA PROCESSING METHOD

(75) Inventor: Kiyoshi Nishimura, Kyoto (JP)

(73) Assignee: Rohm Co., LTD, Kyoto (JP)

( * ) Notice: Subject to any disclaimer, the term of this patent is extended or adjusted under 35 U.S.C. 154(b) by 0 days.

(21) Appl. No.: 09/546,010

(22) Filed: Apr. 10, 2000

(30) Foreign Application Priority Data

Apr. 9, 1999 (JP) .......................................... 11-102640

(51) Int. Cl.⁷ .............................................. G06K 19/06
(52) U.S. Cl. ...................... 714/18; 714/748; 235/449; 235/488; 235/492; 235/493
(58) Field of Search .................... 714/18, 748; 235/449, 235/488, 492, 493

(56) References Cited

U.S. PATENT DOCUMENTS

| | | | | |
|---|---|---|---|---|
| 4,841,526 A | * | 6/1989 | Wilson et al. | 714/748 |
| 4,941,144 A | * | 7/1990 | Mizukami | 714/708 |
| 5,182,442 A | * | 1/1993 | Takahira | 235/492 |
| 5,245,616 A | * | 9/1993 | Olson | 714/748 |
| 5,790,366 A | * | 8/1998 | Desu et al. | 361/305 |
| 6,027,029 A | * | 2/2000 | Kim | 235/492 |
| 6,070,795 A | * | 6/2000 | Feiken | 235/380 |
| 6,070,804 A | * | 6/2000 | Miyamoto | 235/494 |
| 6,126,077 A | * | 10/2000 | Tanaka et al. | 235/492 |
| 6,164,532 A | * | 12/2000 | Suga et al. | 235/380 |
| 6,497,370 B1 | * | 12/2002 | Moreaux | 235/492 |

OTHER PUBLICATIONS

Patterson et al., Computer Organization & Design The Hardware/Software Interface, 1998, Morgan Kaufmann Publishers, Inc., Second Edition, pp. 436–465.*

* cited by examiner

Primary Examiner—Robert Beausoliel
Assistant Examiner—Michael Maskulinski
(74) Attorney, Agent, or Firm—Hogan & Hartson, LLP

(57) ABSTRACT

A data processing system including first and second data processing devices communicating in a non-contact manner. The first data processing device divides the data into a plurality of data groups and sequentially transmits the data groups to the second data processing device. The second data processing device receives the input data and power from the first data processing unit and processes the input data. A detection control device of the second data processor detects whether the processing of the present data group is successful. If the processing of the present data group is successful, the second data processing device stores the processing result for the present data group in a memory device and transmits a signal to the first data processing device indicating that the processing is successful. The first data processing device then transmits the next data group and the second data processing device continues to process the next data group. If the processing of the present data group is unsuccessful, the second data processing device outputs from the memory the stored processing results for the immediately previous data group, and transmits a signal to the first data processing device indicating that the processing is unsuccessful. The first data processing device then re-transmits the present data group and the second data processing device re-processes the present data group. Whether the processing of the present data group is successful is detected by detecting whether a predetermined electric power is received during a time period in which the present data group is processed.

10 Claims, 12 Drawing Sheets

DATA PROCESSING SYSTEM, DATA PROCESSOR AND DATA PROCESSING METHOD

BACKGROUND OF THE INVENTION

1. Field of the Invention

The present invention relates to a data processing system method and apparatus and in particular to method and apparatus for processing a series of mutually related data.

2. Description of the Related Art

IC cards are used as identification tags for credit cards or when circulating and distributing goods. The circuit shown in FIG. 12 is a known logic process circuit conventionally used for IC cards. The logic process circuit 2 in FIG. 12 is composed of a combinational logic block CB that comprises NAND circuits and OR circuits, etc., and a latch block LT that latches an output of the combinational logic block CB.

The combinational logic block CB executes a prescribed logic operation in response to input data IN and outputs an operational result OUT. The latch block LT latches the operational result OUT when a clock pulse $C_p$ rises (or falls) and subsequently output an output Q.

By using the logic process circuit 2, each operational result OUT is latched as the clock pulse $C_p$ rises (or falls) and the latched operational result can be output while the clock pulse $C_p$ is "H" (or "L"). Consequently, noise is eliminated from the operational result and a stable output can be obtained. Accordingly, by using a plurality of the logic process circuits 2 in a combination, a highly reliable sequential logic processing can be performed.

Conventional logic process circuits 2, however, have had the following problems. In conventional logic process circuits, a voltage had to be consistently applied to the circuits to retain the data that were being processed. Therefore, if a power failure occurs in the midst of a logic operation, the operational results prior to the power failure were not recovered even when the power source was restored.

In a sequential logic processing, i.e., receiving a series of mutually related data from a host computer (not shown in FIG. 12) and sequentially processing them, the prior processing must be used for the succeeding processing. If the power source failed during the sequential logic processing in the conventional logic process circuits, the entire series of data had to be reprocessed. Therefore, the process lacked reliability and was wasteful.

Particularly, the power supply of non-contact IC cards, etc., was easily disturbed since the power was supplied through radio waves. As a result, when the volume of a series of data to be sequentially processed was high, a sequential logic processing had to be frequently repeated. In consequence, the sequential logic processing often took a long time to complete.

SUMMARY OF THE INVENTION

An object of the present invention is to solve these and other problems associated with conventional logic process circuits and provide a data processing system, data processor, and data processing method that can process a series of mutually related data quickly.

To achieve these and other advantages and in accordance with the purpose of the present invention, as embodied and broadly described, the present invention provides a data processing system that can divide a series of mutually related data into a number of data groups and sequentially process the series of data.

The data processing system in accordance with the present invention comprises a process output circuit which processes and outputs input data, a memory device which stores data, and a process control device which detects whether or not the present data group is processed by the process output circuit successfully. When the process control device detects that a process has been successful, it stores the present data group in the memory device and causes the process output circuit to continuously process the next data group. On the other hand, when the process control device detects that a process has failed, it causes the process output circuit to output the processing result of the preceding data group stored in the memory device and to continuously reprocess the present data.

In another aspect, the present invention provides a method for data processing which sequentially processes a series of mutually related data by dividing the series into a number of data groups. The method for data processing in accordance with the present invention comprises the step of storing the present data group and causing the process output circuit to continuously process the next data group when the process control device detects that the process has been successful. Moreover, the method for data processing in accordance with the present invention also comprises the step of causing the processing result of the stored preceding data group to be output and causing the present data to be continuously reprocessed when the process control device detects that the process has failed.

Therefore, it is not necessary to reprocess the entire series of data from the beginning even when the process of the present data group fails because the present invention allows the process to resume from the present data group. Accordingly, the process can continuously process mutually related data without wasting the proceeding results prior to the moment of failure.

Moreover, a number of rewriting contents stored in the memory device is minimized because only the processing results of the present data group, not the entire processing results processed until the moment of the power failure, are stored. In consequence, even if some time must be spent rewriting the stored contents, the total data processing time can be shortened compared to the time it would take in case the entire processing results must be reprocessed. In addition, a high speed rewritable memory device can be used since there is no restriction on the number of rewriting. In other words, the present invention allows a series of mutually related data to be processed quickly.

DETAILED DESCRIPTION OF THE PREFERRED EMBODIMENTS

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

Figure 1:
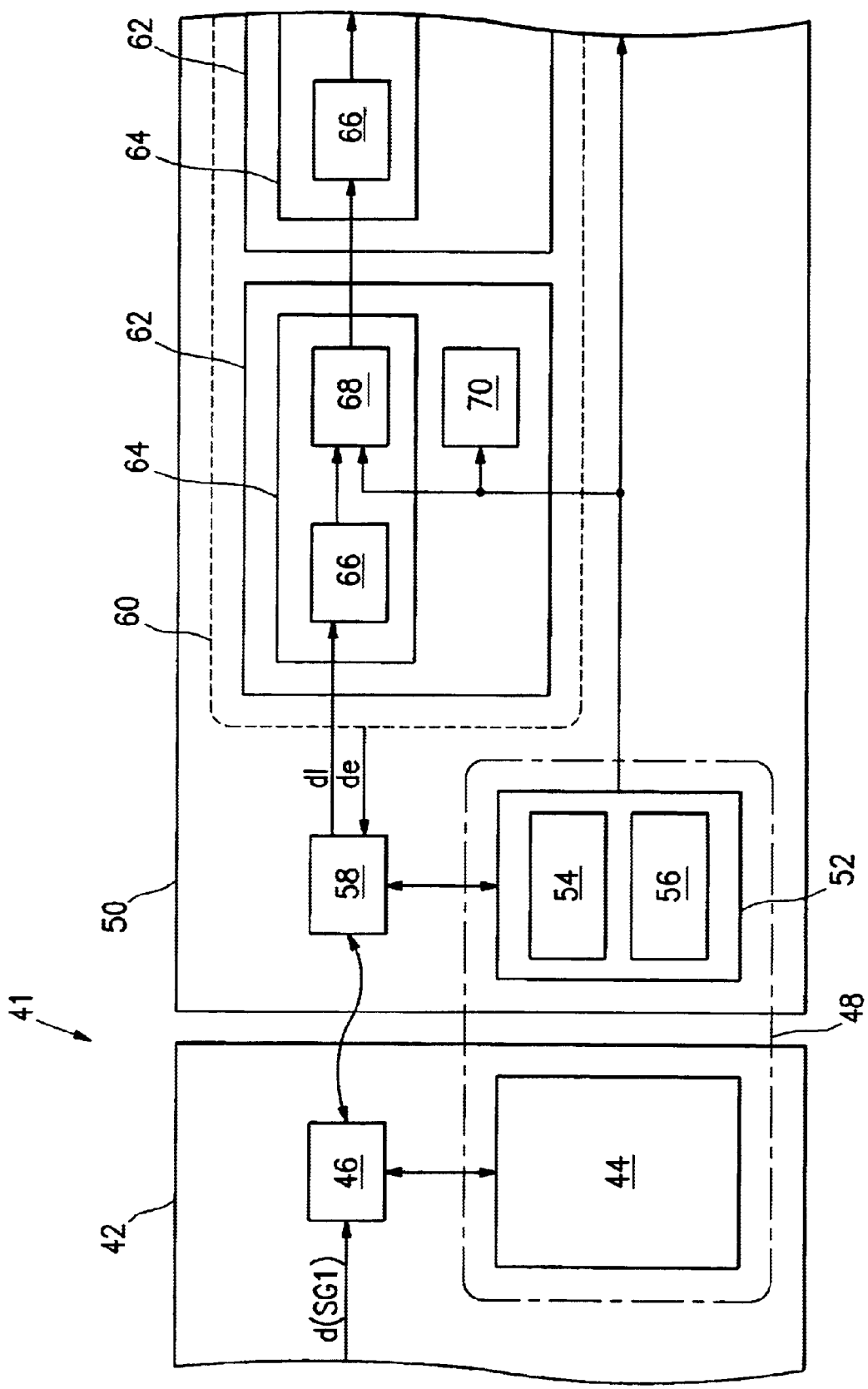
FIG. 1 is a block diagram of a data processing system 41 according to one embodiment of the present invention.

FIG. 1 illustrates a portion of a data processing system 41 in accordance with one embodiment of the present invention. The data processing system 41 is a data processing system that divides a series of mutually related data d into a number of data groups $d_i$~$d_n$ (refer to Signal SG1 in FIG. 6) and is provided with a first data processor 42 and a second data processor 50 that non-contactly communicate with each other.

The second data processor 50 is a non-contact IC card (a local device) which is a mobile communications device. The first data processor 42 non-contactly supplies an electric power to the IC card and is a host device that is a fixed communications device that operates non-contact data communications with the IC card. The second data processor 50 is considered to be an external device of the first data processor 42 and the first data processor 42 is considered to be an external device of the second data processor 50.

The first data processor 42 is configured to divide the series of data d into a number of data groups $d_i$~$d_n$ and to send them to the second data processor 50. It is equipped with a first input/output unit 46 and a send control device 44 which will be explained later. The second data processor 50 is provided with a second input/output unit 58, a processing unit 60, and a detection control device 52. The second data processor 50 is also configured to non-contactly receive a supply of electric power from the first data processor 42.

The processing unit 60 is composed in a manner in which a number of processing cells 62 are connected, and these processing cells 62 are configured to process input data in regular succession. Each processing cell 62 is equipped with a process output circuit 64 and a memory device 70. Although FIG. 1 illustrates only 2 processing cells 62 connected in series, a number of processing cells 62 is generally connected in combinational serial and parallel connections.

Each process output circuit 64 is configured to process data input from the process output circuit in the preceding stage and output the data to the process output circuit 64 in the succeeding stage. Each process output circuit 64 is equipped with a combinational circuit 66 that processes input data and a latch circuit 68 that latches and outputs the processing results of the combinational circuit 66.

The memory device 70 is a nonvolatile memory device using ferroelectric materials and is capable of retaining data even when the power source fails. For each memory device 70, there is provided a corresponding latch circuit 68. Data is exchanged between the memory device 70 and the corresponding latch circuit 68 under the control of the detection control device 52. The detection control device 52 detects whether or not a data group $d_m$ (refer to Signal SG4 in FIG. 6) being processed by the second data processor 50 is successful. Specifically, the second data processor 50 uses a power source monitor circuit 56 to detect whether or not prescribed electric power is sustained while it receives the data group $d_m$ to make the success or failure detection.

When the detection control device 52 detects a successful receipt of data, the processing results of the present data group $d_m$ of each processing output device 64 is stored in the respective memory device 70. Moreover, the detection control device 52 causes each process output circuit 64 to continuously obtain and process the next data group $d_{m+1}$ from the first data processor 42. On the other hand, when the detection control device 52 detects an unsuccessful receipt of data, the detection control device 52 causes the processing output device 64 to output the processing results of the preceding data group $d_{m-1}$ stored in the respective memory device 70. Moreover, the detection control device 52 causes the processing output device 64 to obtain the present data group $d_m$ again from the first data processor 42 and controls the process output circuit 64 to re-process the present data group.

The send control device 44 of the first data processor 42 (explained above) receives a success or failure detection result from the detection control device 52 of the second data processor 50. When the detection result is successful, the send control device 44 sends the next data group $d_{m+1}$ to the second data processor 50. On the other hand, when the detection result is unsuccessful, the send control device 44 controls the second data processor 50 to send once again the present data group $d_m$.

Consequently, the series of data d does not have to be retransmitted in its entirety from the beginning even when the transmission process of the present data group $d_m$ is not successful. The transmission process can resume from the present data group $d_m$. Accordingly, the process can continue without losing the data groups $d_i$~$d_{m-1}$ transmitted prior to the moment of unsuccessful process.

Since only the final processing result of all data groups $d_i$ rather than all data groups $d_i$ preceding the unsuccessful process must be stored, the number of times of rewriting in the memory device 70 can be minimized. In consequence, even when rewriting takes some time, the total data processing time is still relatively short. In addition, a high speed rewritable memory element can be used because a limitation for the number of times of rewriting does not have be considered. Therefore, even though a system that communicates non-contactly can easily become unstable by a subtle change in the environment, the system described above is able to send a series of mutually related data d quickly.

Figure 6:
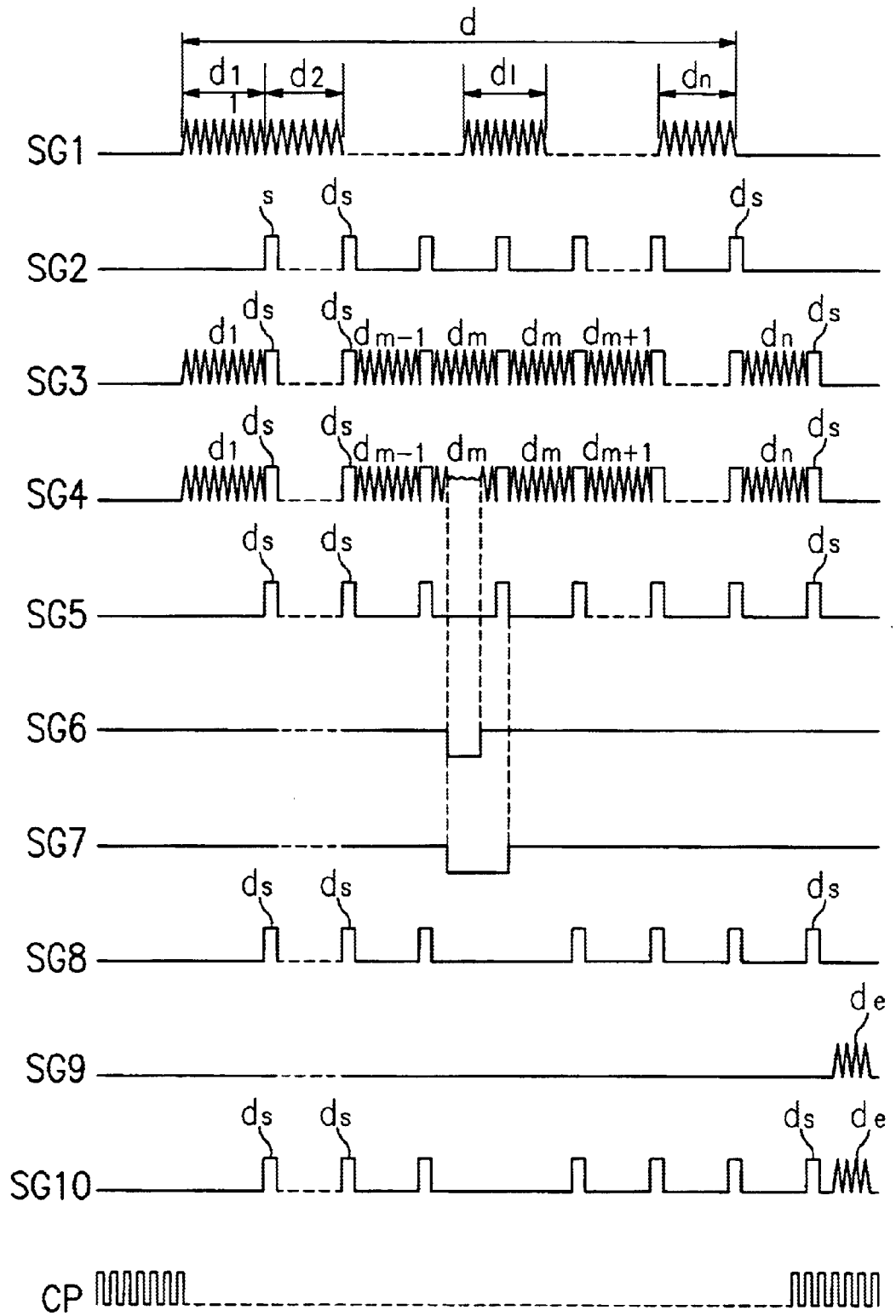
FIG. 6 is a timing diagram illustrating a data transmission process by the data processing system 41.

In this embodiment, the first data processor 42 is configured to divide the series of data d into a number of data groups $d_l$–$d_n$, delimit them by delimiter data $d_s$, and send the processing results of the demarcation to the second data processor 50 as illustrated in FIG. 6. Moreover, the second data processor 50 is equipped with a delimiter data detection circuit 54 and configured to recognize boundaries of all data groups $d_l$–$d_n$ delimited by delimiter data $d_s$.

Accordingly, the first data processor 42 is able to divide the series of data d into a number of data groups $d_l$–$d_n$ by a simple process of demarcating them by delimiter data $d_s$. Moreover, the second data processor 50 is able to know exactly when to store processing results of data groups $d_l$–$d_n$ by detecting delimiter data $d_s$ and recognizing boundaries of data groups $d_l$–$d_n$.

The detection control device 52 of the second data processor 50 is configured to send back a signal based on delimiter data $d_s$ to the first data processor 42 when the result of the success or failure detection is a success, but not to send back the signal based on the delimiter data $d_s$ to the first data processor 42 when a failed process is detected. The send control device 44 of the first data processor 42 is configured to know the success or failure detection result according to whether or not the signal based on the delimiter data $d_s$ is sent back.

Consequently, the second data processor 50 is able to inform the first data processor 42 of a success or failure detection result by simply sending back the delimiter data $d_s$ given by the first data processor 42. In this case, the first data processor 42 is able to know the success or failure detection result by simply comparing the delimiter data $d_s$ it created against the returned delimiter data $d_s$. Moreover, the process control device 48 comprises the detection control device 52 of the second data processor 50 and the send control device 44 of the first data processor 42.

In this embodiment, the amount of data in each data group $d_i$ is fixed to ensure that the time required to process each data groups $d_i$ (i=1, 2, . . . or n, hereinafter omitted) is shorter than the time interval predicted for data processing becoming incomplete. Specifically, the amount of data in each data group $d_i$ is fixed to ensure that the time required for processing each data group $d_i$ is shorter than the time interval predicted for electric power supply becoming incomplete.

Accordingly, in such a system of which the power supply failure can easily occur when the second data processor 50 is moved, by predicting the power supply failure period and fixing the amount of data in all data groups $d_i$ to correspond to the predicted power supply failure period, at least one data group can be transmitted in a short period of time while there still remains some power. In summary, the series of mutually related data d can be transmitted more reliably.

In this embodiment, the time required for processing all data groups $d_i$ is set at about 100 μsec (microseconds) as an example. In other words, the time interval of one delimiter data $d_s$ from the next in a signal SG2 to be noted later (refer to FIG. 6) is set at 100 μsec (microseconds). For instance, a cycle of a system clock $C_p$ to be noted later (refer to FIG. 6) is set at about 100 nsec (nanoseconds).

Figure 2:
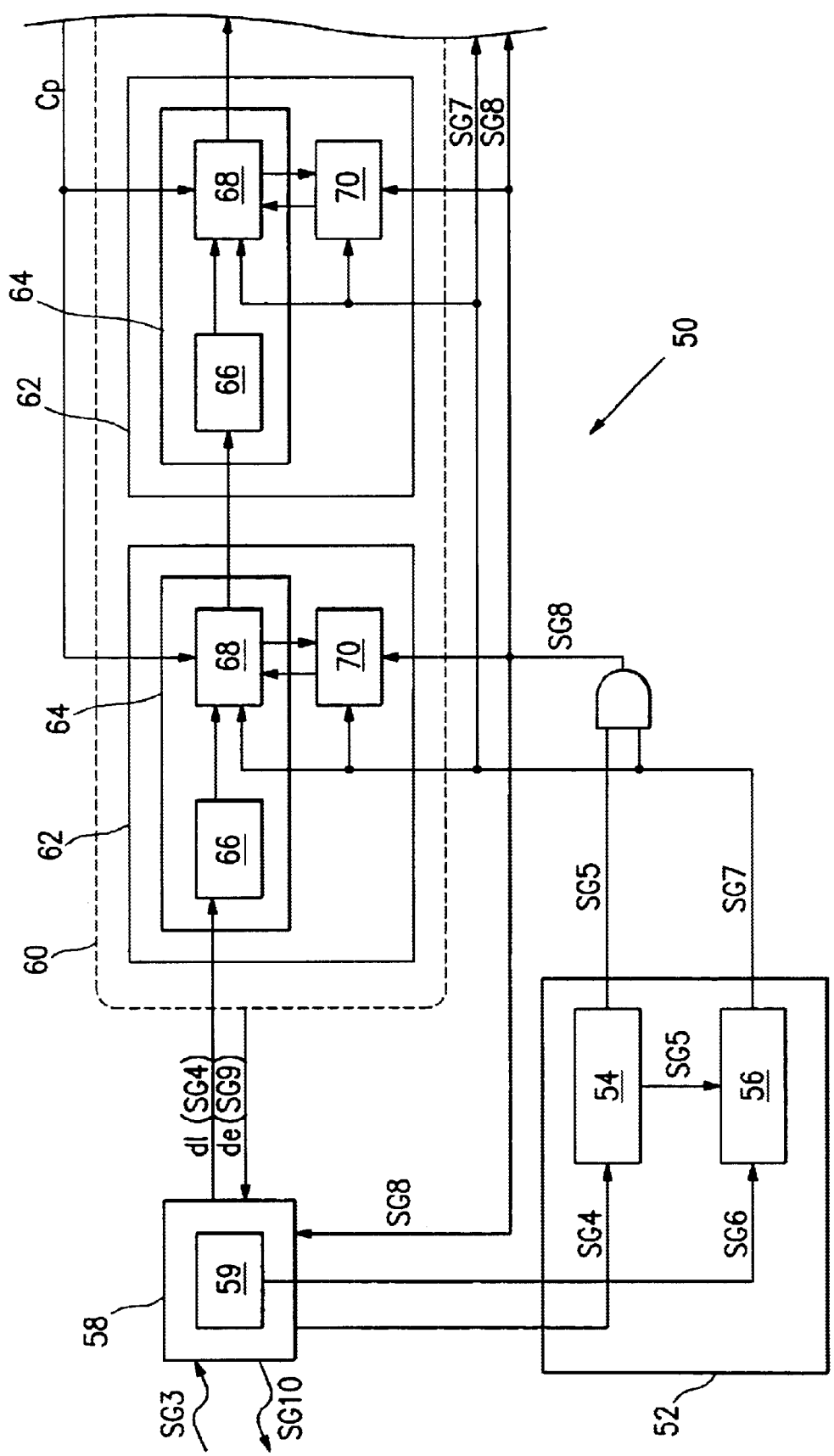
FIG. 2 is block diagram of a second data processor 50 of FIG. 1.
Figure 3:
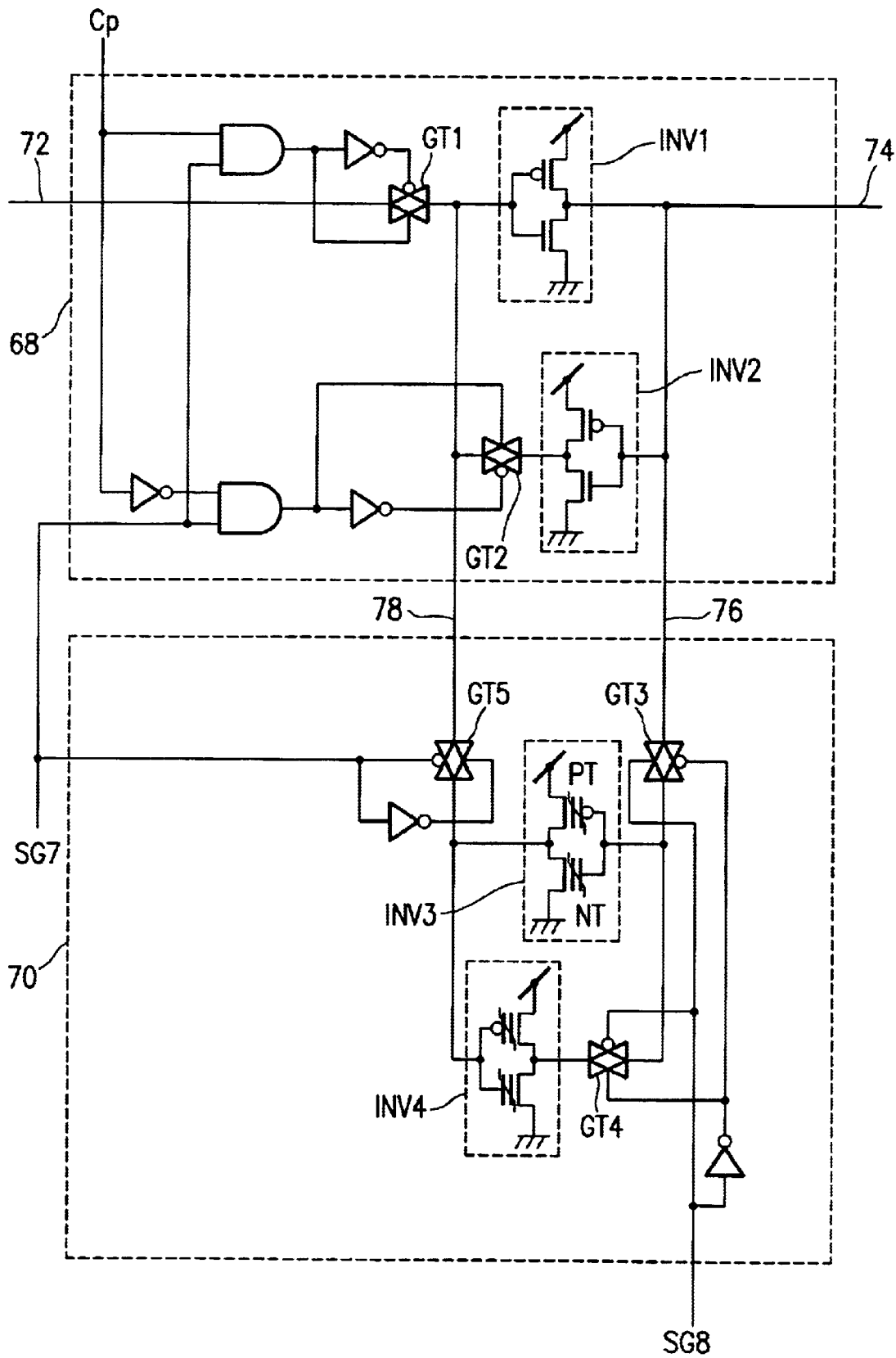
FIG. 3 illustrates a latch circuit 68 and a memory device 70 of a processing cell 62 of FIG. 2.

FIG. 2 illustrates the second data processor 50 and the communications within the second data processor 50. FIG. 3 illustrates one embodiment the processing unit 60 of the second data processor 50, comprising a latch circuit 68 and the memory device 70.

As shown in FIG. 3, the latch circuit 68 comprises two inverter circuits INV1 and a INV2, two transmission gates GT1 and GT2, and lines 72 and 74. Data processed by the combinational circuit 66 (refer to FIG. 2) are input to the latch circuit 68 through a line 72 and latched as the system clock $C_p$ (refer to FIG. 6) rises and falls. Latched data are output to the combinational circuit 66 of the succeeding stage (refer to FIG. 2) through the line 74. The memory device 70 comprises two inverter circuits INV3 and INV4, three transmission gates GT3, GT4, and GT5 and lines 76 and 78. Data output to the line 74 of the latch circuit 68 are input to the memory device 70 through the line 76 and latched when a signal SG8 (which will be explained below in reference to FIG. 6) falls. Latched data are output to the combinational circuit 66 of the succeeding stage (refer to FIG. 2) through lines 78 and 74 when a signal SG7 (which will be explained below in reference to FIG. 6) reaches an "L" level. The inverter circuits INV1 and INV2 in the circuit 68 are both CMOS inverter circuits using a regular P-channel MOSFET and an N channel MOSFET while the inverter circuits INV3 and INV4 in the memory device 70 are both inverter circuits using ferroelectric transistors.

The inverter circuit INV3 will be used as an example for an explanation hereinafter. As illustrated in FIG. 3, the inverter circuit INV3 comprises a transistor PT and a transistor NT, both of which are ferroelectric transistors. The transistor PT and the transistor NT are so-called MFMIS-structured ferroelectric transistors or transistors structured by laminating with metal at the top followed by insulation materials, metal, contact materials, and ferroelectric materials.

Figure 4A:
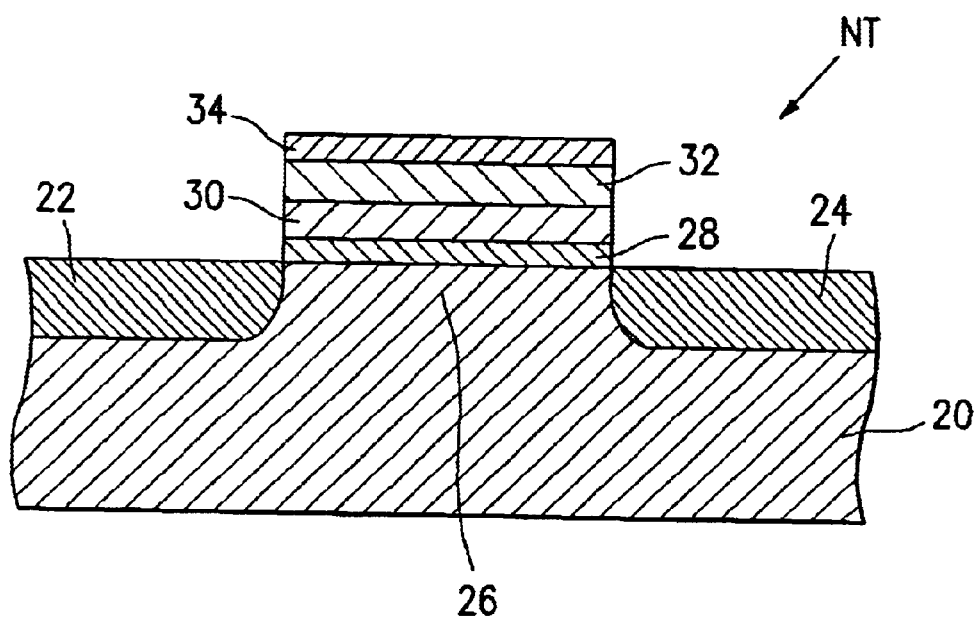
FIG. 4A is a sectional view showing the structure of a transistor NT.

FIG. 4A illustrates a structure of the transistor NT. Over a p-type silicon base 20, which is a semiconductor substrate, a source area 22 and a drain area 24 that are an n-type (the first contact type) semiconductors are provided. Over a channel forming area 26 which is a p-type (the second contact type) semiconductor, a silicon oxide ($SiO_2$) insulation layer 28 is provided. Over the insulation layer 28A there is provided a lower conductor layer 30 (the first conductor layer) which is laminated with poly-Si, $IrO_2$ and Ir in this order. A ferroelectric layer 32 formed by PZT, etc. is provided over the lower conductor layer. The ferroelectric layer 32 maintains a polarized condition corresponding to the on and off state of the transistor NT which will be explained below. Over the ferroelectric layer, there is additionally provided an upper conductor layer 34 (the second conductor layer) which is laminated with $IrO_2$ and Ir in this order. Moreover, silicon nitrogen (SiN) in addition to above materials can be used for the insulation layer 28. Additionally, oxide conductors such as RuOx or ITO and metals such as Pt, Pb, Au, Ag, Al, and Ni can also be used for the lower conductor layer 30 and the upper conductor layer 34.

Figure 4B:
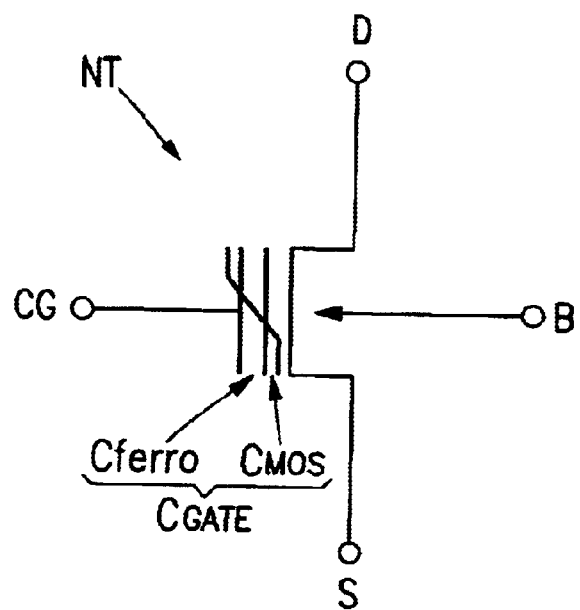
FIG. 4B is a circuit diagram of the transistor NT of FIG. 4A.

FIG. 4B is a circuit diagram of the transistor NT shown in FIG. 4A. A control gate electrode CG is connected to the upper conductor layer 34. The lower conductor layer 30 is a floating state since no electrode is connected. A source electrode S is connected to the source area 22 and a drain electrode D is connected to the drain area 24. As shown in FIG. 3, the control gate electrode CG (an input side of the inverter circuit INV3) is connected via the transmission gate GT4 to an output side of the inverter circuit INV4. The drain electrode D (an output side of the inverter circuit INV3) is connected to an input side of the inverter circuit INV4. The source electrode S is grounded. The transistor NT and the transistor PT have exactly the same structure except that the transistor NT is a N channel type MOSFET while the transistor PT is a P channel type MOSFET. In consequence, the transistor PT is also a MFMIS structured ferroelectric transistor. The source electrode S of the transistor PT is given a power source electric potential.

Figure 5:
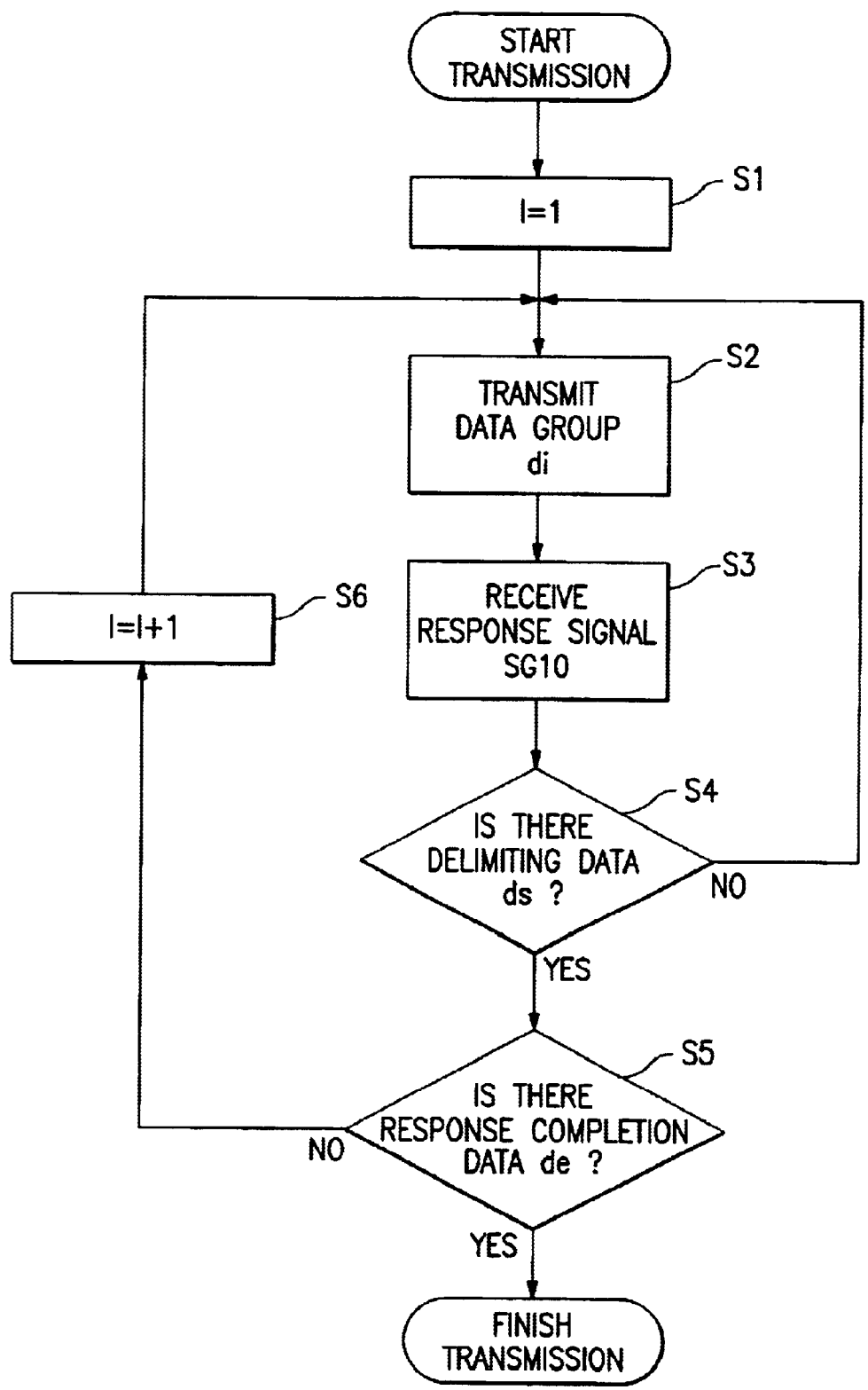
FIG. 5 is a flow chart illustrating the process of data transmission by the first data processor 42 of FIG. 1.
Figure 7:
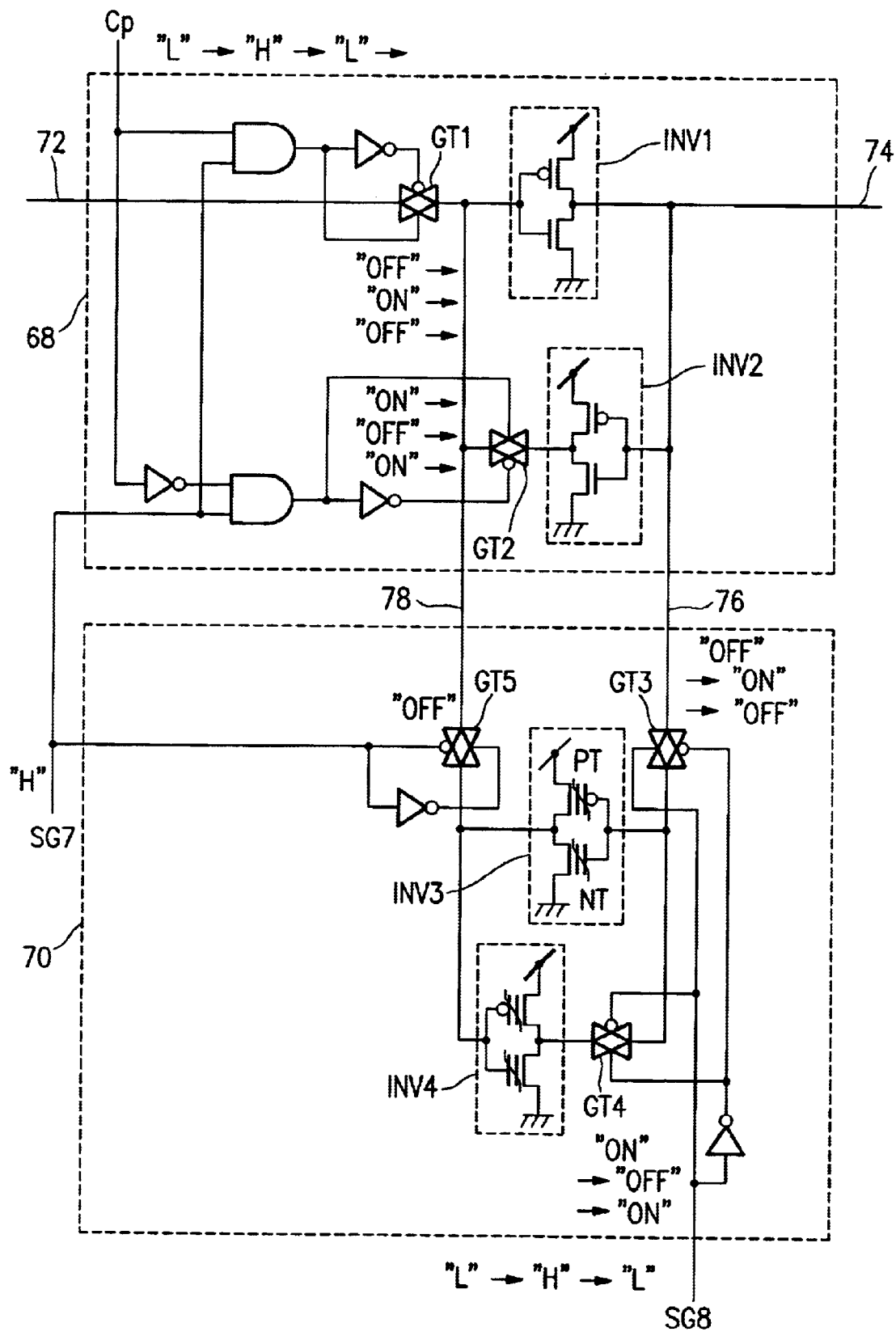
FIG. 7 shows the processing state of the latch circuit 68 and the memory device 70 when the power source is secured.
Figure 8:
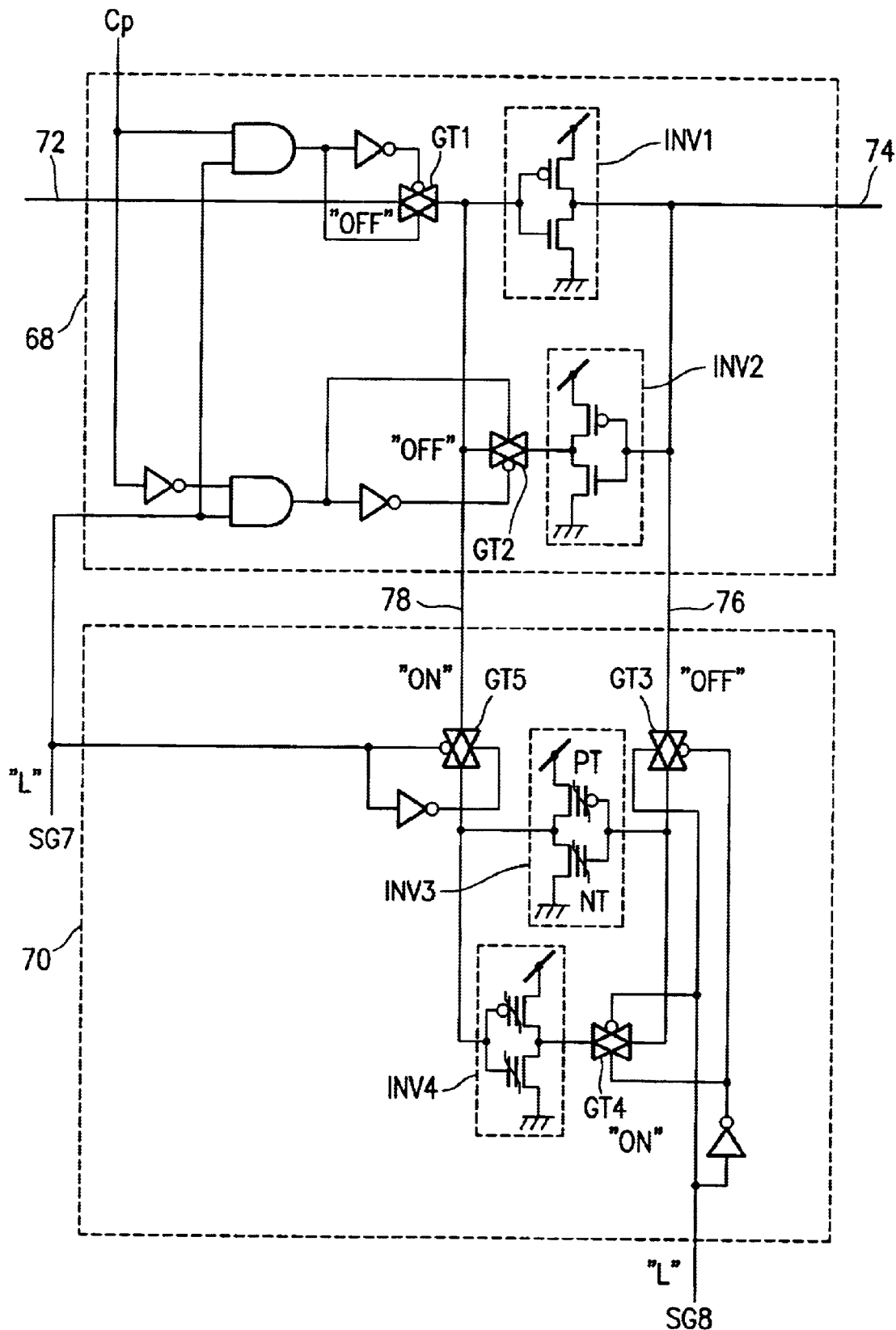
FIG. 8 shows the processing state of the latch circuit 68 and the memory device 70 when the power source is not secured.

FIG. 5 is a flow chart illustrating how the first data processor 42 handles a data transmission process between the first data processor 42 and the second data processor 50 of the data processing system 41 shown in FIG. 1. FIG. 6 illustrates a timing chart which explains particulars of this data transmission process by the data processing system 41. FIG. 7 illustrates an operation of the latch circuit 68 and the memory device 70 in a state in which the power source of the second data processor 50 is secured, i.e., the data transmission process is functioning normally. In contrast, FIG. 8 illustrates the operation of the latch circuit 68 and the memory device 70 when the power source is not secured. Hereinafter, in reference to FIGS. 5–8, and by referring also to FIG. 1 and FIG. 2, steps of a data transmission process by the data processing system 41 will be explained.

The send control device 44 of the first data processor 42 shown in FIG. 1 fetches a series of data expressed by the signal SG1 (refer to FIG. 6) from a memory device or the like (not shown) to the first input/output unit 46, divides the fetched series of data d into a number of data groups $d_i \sim d_n$, delimits them by delimiter data $d_s$ expressed by the signal SG2 (refer to FIG. 6) to a signal expressed by the signal SG3 (refer to FIG. 6), and sends it to the second data processor 50 as follows.

First, as shown in FIG. 5, the send control device 44 sets the numeric value i of a designated counter (not shown) to "1". Next, in reference to the counter, the first input/output unit 46 is controlled to send a signal corresponding to the data group $d_l$ and the delimiter data $d_s$ that follows the data group $d_l$ (refer to the signal SG3 in FIG. 6) (Step S2). The sent signal SG3 is received by the second input/output unit 58 of the second data processor 50 as shown in FIG. 2. The received signal is referred to as the signal SG4 (refer to FIG. 6). The received signal SG4 is converted to a predetermined format at the second input/output unit 58 and sent to combinational circuits 66. If communications were normal, the received signal SG4 will include the data group $d_l$. All data comprising the data group $d_l$ are sequentially input to the combinational circuits 66, computed in the combinational circuits 66, and output to latch circuits 68. The delimiter data detection circuit 54 separates the delimiter data $d_s$ from the received signal SG4 and outputs it as the signal SG5 (refer to FIG. 6).

The power source unit 59 of the second input/output unit 58 fetches an electric power from the received signal SG4 and supplies the power to the entire second data processor 50. By monitoring the signal SG6 (refer to FIG. 6) from the power source unit 59, the monitor circuit 56 monitors whether or not the prescribed power is supplied to the second data processor 50, i.e., whether or not the communications were performed normally. The power source monitor 56 is configured to set the power monitor signal SG7 to "L" when the signal SG6 from the power source unit 59 falls and the power source monitor signal SG7 to "H" when the signal SG5 from the delimiter data detection circuit 54 falls. For example, as shown in FIG. 6, when a power supply error occurs while the data group $d_m$ (refer to the signal SG4) is being received, the power source monitor signal SG7 immediately becomes "L". Thereafter, the power source monitor signal SG7 does not return to "H" immediately after the power supply returns. The signal returns to "H" only when it detects that a fall of the delimiter data $d_s$ which indicates the transmission completion of the data group $d_m$.

As shown in FIG. 2, the power source monitor signal SG7 is used as a signal that controls transmission gates of the latch circuits 68 and the memory device 70. The power source signal SG7 and the signal SG5 are ANDed to become a success or failure detection signal SG8 that indicates whether or not the data transmission process of each data group $d_l$ is successful. For instance, the delimiter data $d_s$ appear in the success or failure detection signal SG8 immediately after the data group $d_{m-1}$ is transmitted as shown in FIG. 6 because the transmission was successful. However, the delimiter data $d_s$ does not appear in the success or failure detection signal SG8 immediately after the next data group $d_m$ transmitted because its first transmission was not successful.

As shown in FIG. 2, the success or failure detection signal SG8 is used as a signal to control transmission gates of the memory mean 70 and is also sent back to the first data processor 42 after being synthesized with the signal SG9 (refer to FIG. 6) as the response signal SG10. Receipt completion data $d_e$ created by the process output circuit 64 [Note to client: the Japanese document says "the process output circuit 60". Is it "the process output circuit 64" or "the processing unit 60"?] of the second data processor 50 is included in the signal SG9 when the entire series of data d is confirmed to have been transmitted.

Referring back to FIG. 5, the send control device 44 (refer to FIG. 1) of the first data processor 42 obtains the returned response signal SG10 (refer to FIG. 6) (Step S3) and checks whether or not the delimiter data $d_s$ appears in the response signal SG10 (Step S4). When the delimiter data $d_s$ does appear in the response signal SG10, the transmission process of the data group $d_l$ is determined to have been successful. The send control device 44 also checks whether or not the receipt completion data $d_e$ appears in the response signal SG10 (Step S5). In this step, the receipt completion data $d_e$ does not appear in the response signal SG10 since the entire series of data d is yet to be transmitted. Therefore, the send control device 44 increases and incrementally sets the above noted numeric value i of the counter to "2" as shown in FIG. 5 (Step S6) and goes back to Step S2. The send control device 44 in reference to the counter controls the first input/output unit 46 (refer to FIG. 1) to send the next data group $d_2$ and the signal appropriate to the delimiter data $d_2$ that follows the data group $d_2$ (refer to the signal SG3 in FIG. 6).

As long as the power source remains secure, the aforementioned steps (Step S2~Step S6) are repeated until the last data group $d_n$ and delimiter data $d_s$ that follows the data group $d_n$ are sent and the corresponding response signal SG10 is obtained. When the response signal SG10 corresponding to the last data group $d_n$ (Step S3) is obtained and the delimiter data $d_s$ and the receipt complete data $d_e$ appear in the response signal SG10, the entire series of data d is determined to have been transmitted and the transmission process is terminated.

In reference to FIG. 7, the conditions of the latch circuit 68 and the memory device 70 contained in each processing cell 62 of the second data processor 50 operational state in a case in which the power source remains secured is explained next. As noted above, the data comprising the received data group $d_l$ is computed by the combinational circuit 66 (refer to FIG. 2) and their operational results are consecutively output to the latch circuit 68 through line 72. When the power source is secure, the above noted power source monitor signal SG7 stays at "H" (refer to FIG. 6). Therefore, the transmission gate GT1 of each latch circuit 68 toggles from "OFF" to "ON" and back to "OFF" and so forth, while the transmission gate GT2 toggles from "ON" to "OFF" and back to "ON" and so forth as the system clock $C_p$ (refer to FIG. 6) changes from "L" to "H" and back to "L" and so forth.

As a result, the data input to the latch circuit 68 is latched every time the system clock $C_p$ (refer to FIG. 6) falls and output sequentially to its respective combinational circuit 66 in the succeeding stage through the line 74. In other words, data in the data group $d_i$ is computed sequentially in conjunction with the timing of the system clock $C_p$. Because the above noted success or failure detection signal SG8 (refer to FIG. 6) stays at "L" until the entire series of data composing the data group $d_i$ is computed, the transmission gate GT3 of the memory device 70 is "OFF" while the transmission gate as GT4 is "ON". Consequently, the memory device 70 continues to retain previously written data.

When all data in the data group $d_i$ is computed, the "L" status of the success or failure detection signal SG8 (refer to FIG. 6) changes to "H" and back to "L". In conjunction with these changes, the "OFF" status of transmission gate GT3 of the memory device 70 changes to "ON" and back to "OFF" while the "ON" status of the transmission gate GT4 changes to "OFF" and back to "ON". In consequence, the final operational output of data in the data group $d_i$ is output to the combinational circuit 66 in the succeeding stage (refer to FIG. 2) through the line 74 and is simultaneously latched by the memory device 70 through the line 76 as the success or failure detection signal SG8 falls.

Accordingly, as long as the power source remains secure, the data retained by the memory device 70 is refreshed every time all data in one data group $d_i$ is computed. In other words, the operational results of the data $d_{i-1}$ preceding the present data group $d_i$ being processed is always retained in the memory device 70. As described above, the memory device 70 using ferroelectric transistors is a nonvolatile memory device and does not lose operational results of the preceding data group $d_{i-1}$ even when the power source cannot be secured. Moreover, as long as the power source is secure, the power source monitor signal SG7 stays "H", resulting in the transmission gate GT5 staying "OFF". Therefore, there is no possibility that the data retained in the memory device 70 is sent to the latch circuit 68.

Referring back to FIG. 5, the case of which the power source could not be secured is explained next. When the delimiter data $d_s$ is not included in the response signal SG10 in the step S4, the send control device 44 of the first data processor 42 (refer to FIG. 1) determines that the data transmission process of the data group failed and the process goes back to the step S2 to send the same data group once again. For example, if the transmission process of the data group $d_m$ ends in a failure, the same data group $d_m$ is sent once again (refer to the signal SG3 in FIG. 6). The data group $d_m$ is sent repeatedly until its transmission process is determined successful.

Next, in reference to FIG. 8, the conditions of the latch circuit 68 and the memory device 70 where the power source could not be secured is explained. As described above, the power source monitor signal SG7 falls to "L" when the power source could not be secured (refer to FIG. 6). In consequence, the transmission gates GT1 and GT2 of the latch circuit 68 are "OFF" regardless of the system clock $C_p$ (refer to FIG. 6) while the transmission gate GT5 of the memory device 70 is "ON". As described above, this state will continue until the delimiter data $d_s$ that is first detected when the power source is restored falls. Accordingly, the operational results of the present data group $d_m$ are not sent to the combinational circuit 66 in a succeeding stage even when the power source is restored. Instead, the operational results of the preceding data group $d_{m-1}$ nonvolatily stored in the memory device 70 are sent to the combinational circuit 66 in the succeeding stage through the respective line 78, inverter circuit INV1, and line 74. Since the success or failure detection signal SG8 (refer to FIG. 6) stays as "L" in the above state, the transmission gate GT3 of the memory device 70 is "OFF" while the transmission gate GT4 is "ON". As a result, the memory device 70 continues to retain the operational results of the preceding data group $d_{m-1}$. Because the success or failure detection signal SG8 stays as "L" as described above (in other words, the delimiter data $d_s$ is not included in the response signal SG10), the first data processor 42 (refer to FIG. 1) sends the same data group $d_m$ again. Therefore, each process output circuit 64 that comprises the second data processor 50 can continue to process the data group $d_m$ based on the operational results of the preceding data group $d_{m-1}$ stored in its respective memory device 70 in the preceding step when the power source is restored. Accordingly, the memory device illustrated in FIG. 3 retains data even when the power source fails.

Next, the operation of retaining and reproducing data will be explained. As shown in FIG. 7, the data output by the latch circuit 68 is latched to the memory device 70 when the success or failure detection signal SG8 (refer to FIG. 6) falls, i.e., at the instance the success or failure detection signal SG8 goes back to "L" from "H" (as described above). For convenience of explaining, the output data is called "H". The memory device 70 is equipped with a pair of inverter circuits INV3 and INV4 each of which comprises a pair of ferroelectric transistors. The inverter circuit INV3 will be used as an example to explain the operation of both inverters.

Figure 9:
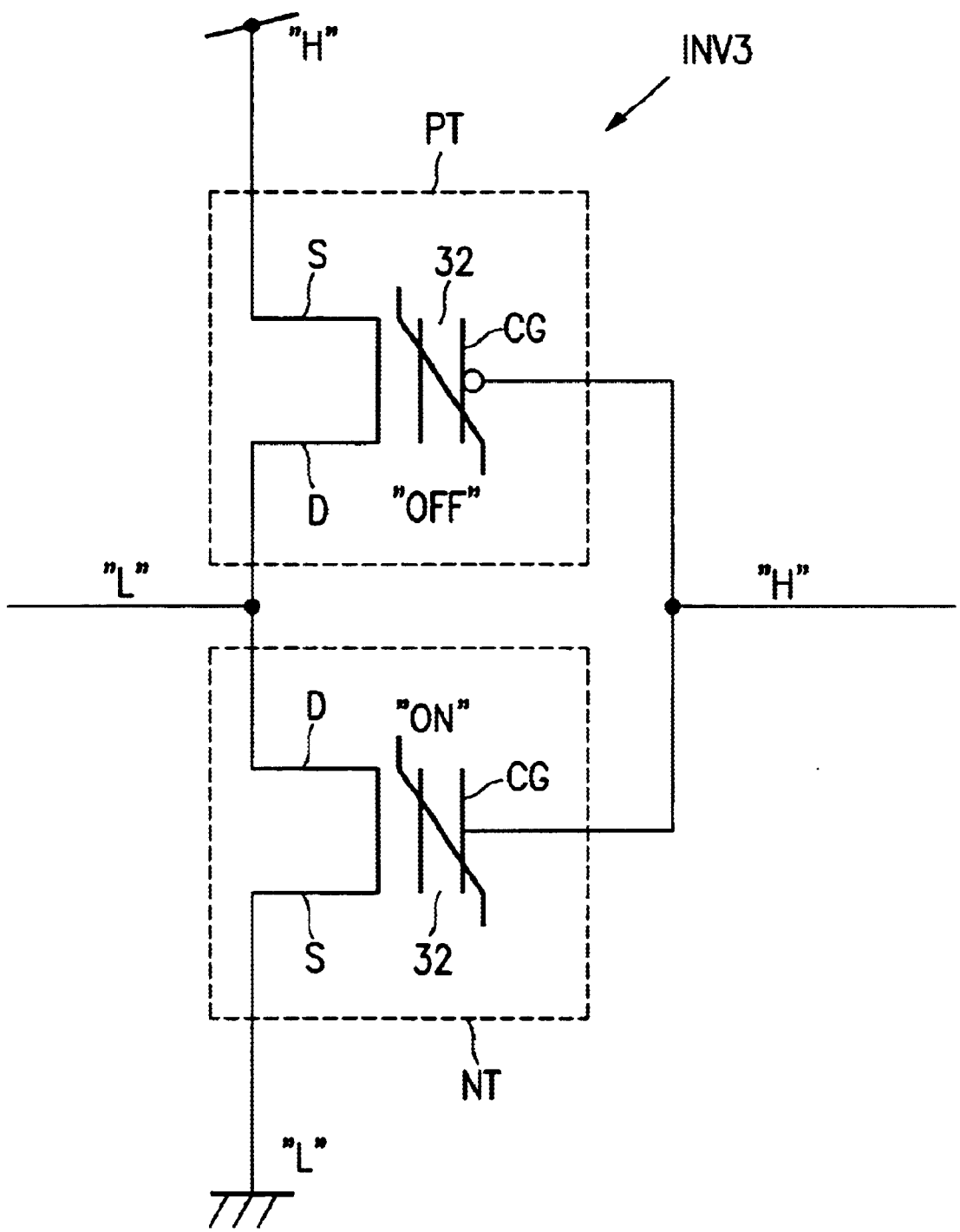
FIG. 9 illustrates the condition of the inverter circuit INV3 of FIG. 3 when a success or failure detection signal SG8 falls.

FIG. 9 illustrates the inverter circuit INV3 when the success or failure detection signal SG8 falls. As seen in FIG. 9, the source electrode S of the transistor NT of the inverter circuit INV3 is given a "L" in electric potential while the source electrode S of the transistor PT is given an "H" in electric potential. The control gate electrode CG of each of the transistors NT and PT is given "H" in electric potential. A threshold $V_{th}$ of each transistor is fixed so that the transistor NT goes "ON" and transistor PT goes "OFF" simultaneously when both control gate electrodes CG reach "H" in electric potential. Consequently, a drain electrode D of each of the transistors NT and PT is "L" in electric potential in this state. In this state, the ferroelectric layer 32 of each of the transistors NT and PT is in a designated polarized state which will be explained below. In summary, the data "H" is written in the memory device 70 as a prescribed polarization condition induced in the ferroelectric layer 32 of each of the transistors NT and PT. If the success or failure detection signal SG8 shown in FIG. 7 subsequently falls to "L", the transmission gate GT3 goes into "OFF". However, the transistor NT sustains its ON status while the transistor PT sustains its OFF status because each of the inverter circuits INV3 and INV4 is capable of self-latching. In other words, the data "H" is latched by the memory device 70.

Figure 10:
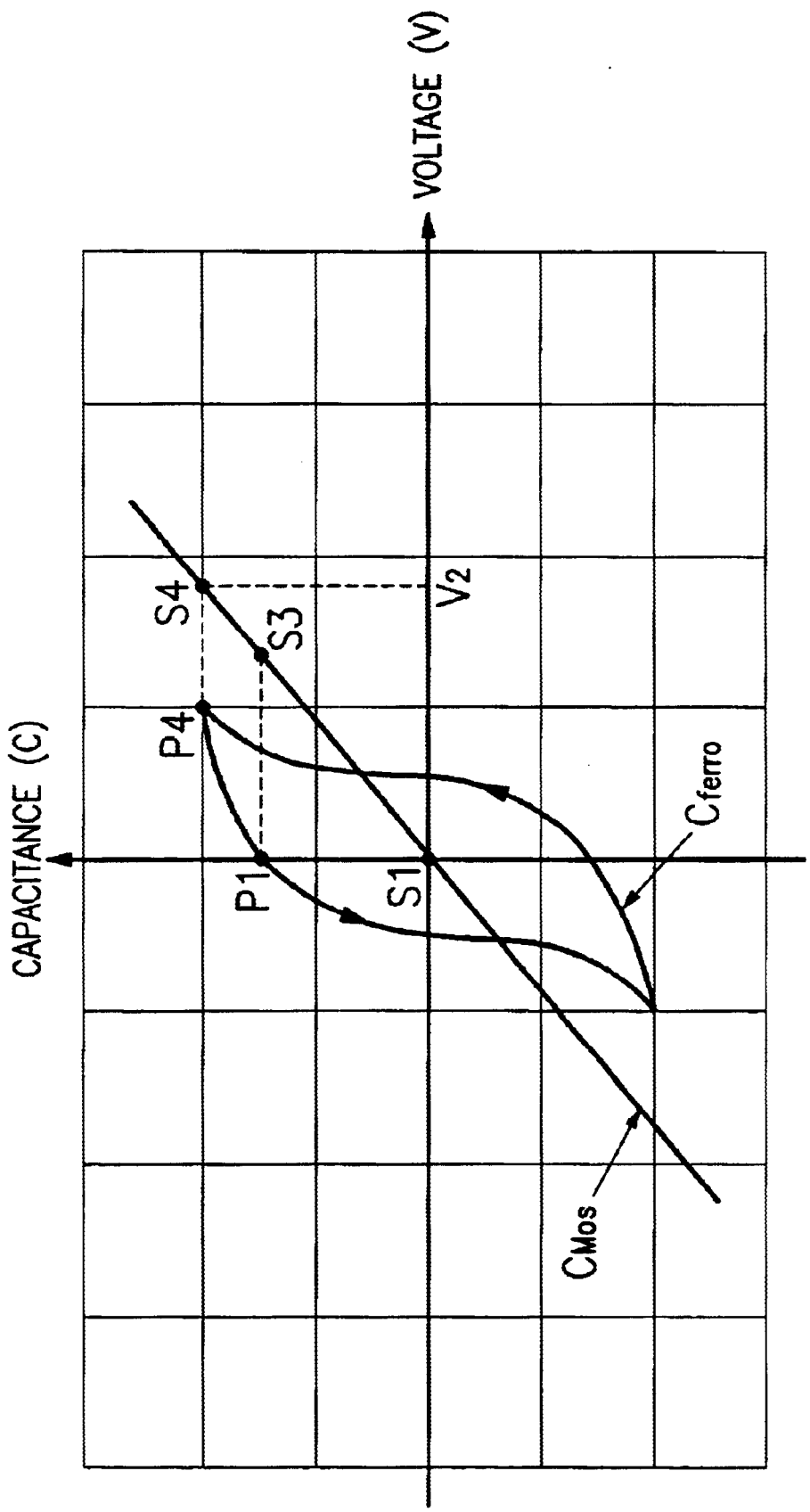
FIG. 10 is a diagram showing voltage and electric charge characteristics of a ferroelectric capacitor $C_{ferro}$ and a MOS capacitor $C_{MOS}$ of a transistor NT when writing data "H".

The state of the transistor NT from the time the data "H" is written until latched by the memory device is explained below. As shown in FIGS. 4A and B, the transistor NT comprises a ferroelectric capacitor $C_{ferro}$ formed between the upper conductor layer 34 and the lower conductor layer 30 and a MOS capacitor $C_{MOS}$ formed between the lower conductor layer 30 and the channel area 26. The ferroelectric capacitor $C_{ferro}$ and MOS capacitor $C_{MOS}$ are connected in series and are combined by a GATE capacitor $C_{GATE}$. FIG. 10 illustrates the ferroelectric capacitor $C_{ferro}$ and the MOS capacitor $C_{MOS}$ of the transistor NT as the electric voltage and charge are varied in a case where the data "H" is being written.

Since the transistor NT is "ON" as described above (refer to FIG. 9), the electric potential of the channel area 26 (refer to FIG. 4A) is almost a grounded electric potential and the control gate electrode CG of the transistor NT is given "H ($V_{DD}$)" in electric potential. Therefore, +$V_{DD}$ in voltage in reference to the voltage of the channel area is applied to the GATE capacitor $C_{GATE}$. In consequence, the condition of the ferroelectric capacitor $C_{ferro}$ becomes the condition indicated by a point P4. At this time, the condition of MOS capacitor $C_{MOS}$ becomes the condition indicated by a point S4 as illustrated in FIG. 10. Also, the value of electric charge of the condition indicated by the point S4 is the same as that of the condition indicated by the point P4. At the point S4, the voltage generated in the MOS Capacity $C_{MOS}$, i.e., at the lower conductor layer 30 (a floating gate), is $V_2$.

Next, the operation of the transistor NT when the power supply to the second data processor 50 is restored after having failed is explained. The electric voltage and charge conditions that appear in the ferroelectric capacitor $C_{ferro}$ and the MOS capacitor $C_{MOS}$ of the transistor NT when the power supply fails while the memory device 70 retains the data "H" in the storage are indicated in FIG. 10 by the points P4 and S4, respectively. As time passes, these values change to the values indicated by a point P1 point and a point S1, respectively. If the power supply is restored at this point, the voltage and charge condition that appears in the MOS capacitor $C_{MOS}$ will suddenly change from the condition indicated by the point S1 to that indicated by a point S3 as soon as the power supply is restored. The value of electric charge of the point S3 is the same as that of the point P1. As time further passes, the voltage and charge conditions that appear in the ferroelectric capacitor $C_{ferro}$ and the MOS capacitor $C_{MOS}$ change back to the conditions indicated by the points P4 and S4 as shown in FIG. 10, respectively. At this point, the voltage generated across the MOS capacitor $C_{MOS}$, namely, the voltage generated across the floating gate, is $V_2$. In short, the transistor NT is in the same ON condition as before the power source failed. As shown in FIG. 10, the voltage and charge conditions of the ferroelectric capacitor $C_{ferro}$ return from the point P1 to the point P4. Also, the conditions of the MOS capacitor $C_{MOS}$ return from the point S1 via the point S3 to the point S4. Although the state of the transistor NT from the moment the data "H" was written until the moment the data is latched and the operation of the transistor NT when the power supply to the second data processor 50 fails (refer to FIG. 1) and is restored was explained above, the state and operation of transistors PT during the same time period are identical to those of the transistor NT.

Similarly, although the inverter circuit INV3 has been used an example to explain the operation, the inverter circuits INV4 operates identically to inverter circuits INV3. When the power source to the second data processor 50 fails and is restored, the memory device 70 is able to return to the state before the power source failed, i.e., the state in which the data "H" is latched as described above. Furthermore, although the memory device 70 with latched data "H" was used an example for this explanation, the memory device 70 operates almost identically when the latched data is "L". In short, the memory device 70 retains its respective data regardless of the contents of the data when the power source fails and can reproduce its respective data when the power source is restored.

As described above, each memory device 70 is provided with the inverter circuits INV3 and INV4 which are ferroelectric transistors. Therefore, the process can resume from the data group $d_m$ based on operational results of the preceding data group $d_{m-1}$ stored quietly in the memory device 70 in the event that the power source to the second data processor 50 fails while the data in the data group $d_m$ is being transmitted. Moreover, because the time required for a ferroelectric material to inverse polarization is short, the time required for the inverter circuits INV3 and INV4 to reach their respective polarization status corresponding to the data output of the latch circuits 68 when writing data is short. In consequence, data can be transmitted at high speed. Furthermore, since a high voltage is not required to write or delete data where a ferroelectric material is used, it is not necessary to provide a booster circuit in the second data processor 50 or prepare a high voltage power source separately from a regular power source. Accordingly, in a case in which the second data processor 50 is an IC card, an enlargement of a chip size of the IC chip and a raise in manufacturing costs can be kept to a minimum.

In this embodiment, a ferroelectric transistor is used for both inverter circuits INV3 and INV4 of the memory device 70. Additionally, each of the inverter circuits INV3 and INV4 comprises a pair of ferroelectric transistors NT and PT. Therefore, when the power source is restored, the contents previously stored in the memory device 70 before the power source failure can be revived with more reliability. Although a ferroelectric transistor was used for both of the inverter circuits INV3 and INV4 in the above embodiments, it is possible to use a ferroelectric transistor for only one of the inverter circuits. Alternatively, a ferroelectric transistor can be used for one of the pairs of transistors NT and PT in an inverter circuit, thereby allowing the processing speed to be further improved.

Figure 11A:
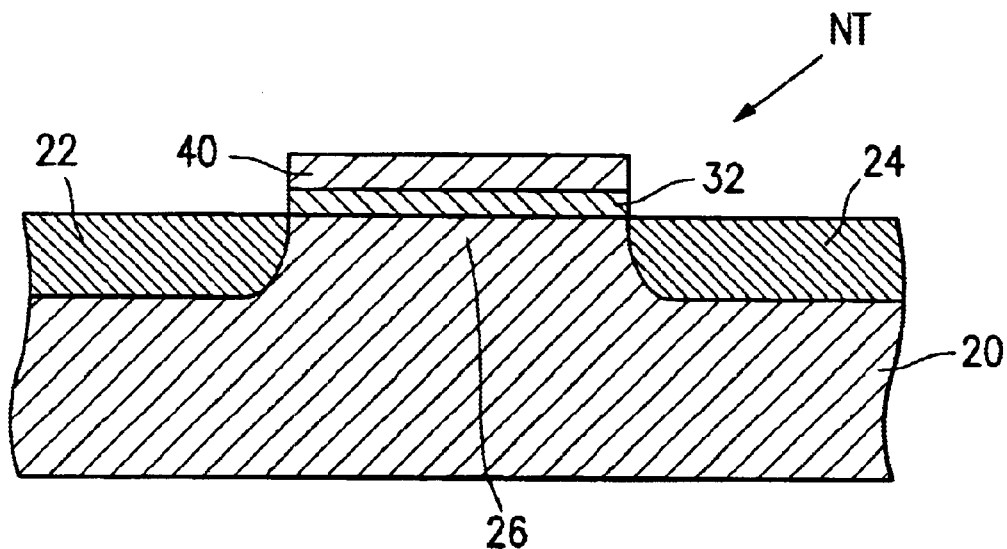
FIG. 11A is a sectional view of another transistor NT.

According to all above described embodiments, a ferroelectric transistor with the so-called MFMIS structure is used as an example. Nonetheless, any type of ferroelectric transistor may be used instead of the MFMIS type. For example, a transistor NT illustrated in FIG. 11A can be used as a ferroelectric transistor. The transistor NT shown in FIG. 11A is an n-channel MOSFET. A source area 22 and drain area 24 that are an n-type semiconductor formed on a p-type silicon base 20. A ferroelectric layer 32 that is made of a ferroelectric material such as PZT, etc. is provided over the channel area 26 which is a p-type semiconductor. A conductor layer 40 is provided over the ferroelectric layer 32. A transistor with this type of a structure is a transistor with the MFS structure (a transistor structured by laminating with a piece of metal at the top followed by a ferroelectric material and silicon). A transistor with the MFIS structure which adds an insulation material between the ferroelectric layer and the silicon layer (the semiconductor substance) can also be used.

Figure 11B:
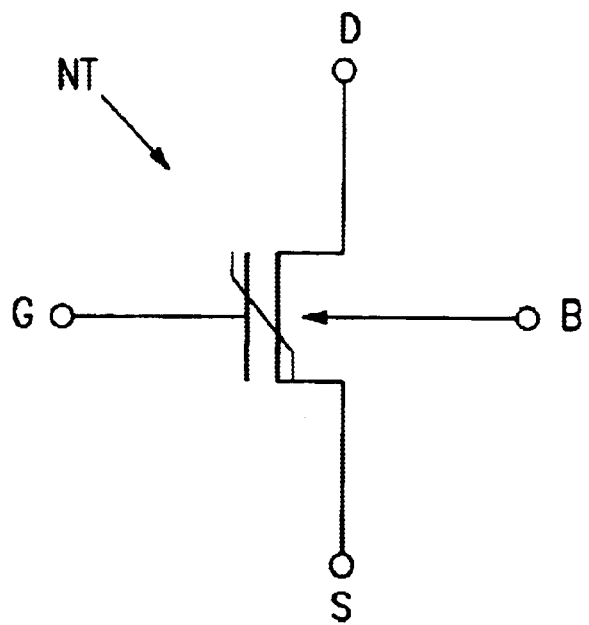
FIG. 11B is a circuit diagram of the transistor NT of FIG. 11A.
Figure 12:
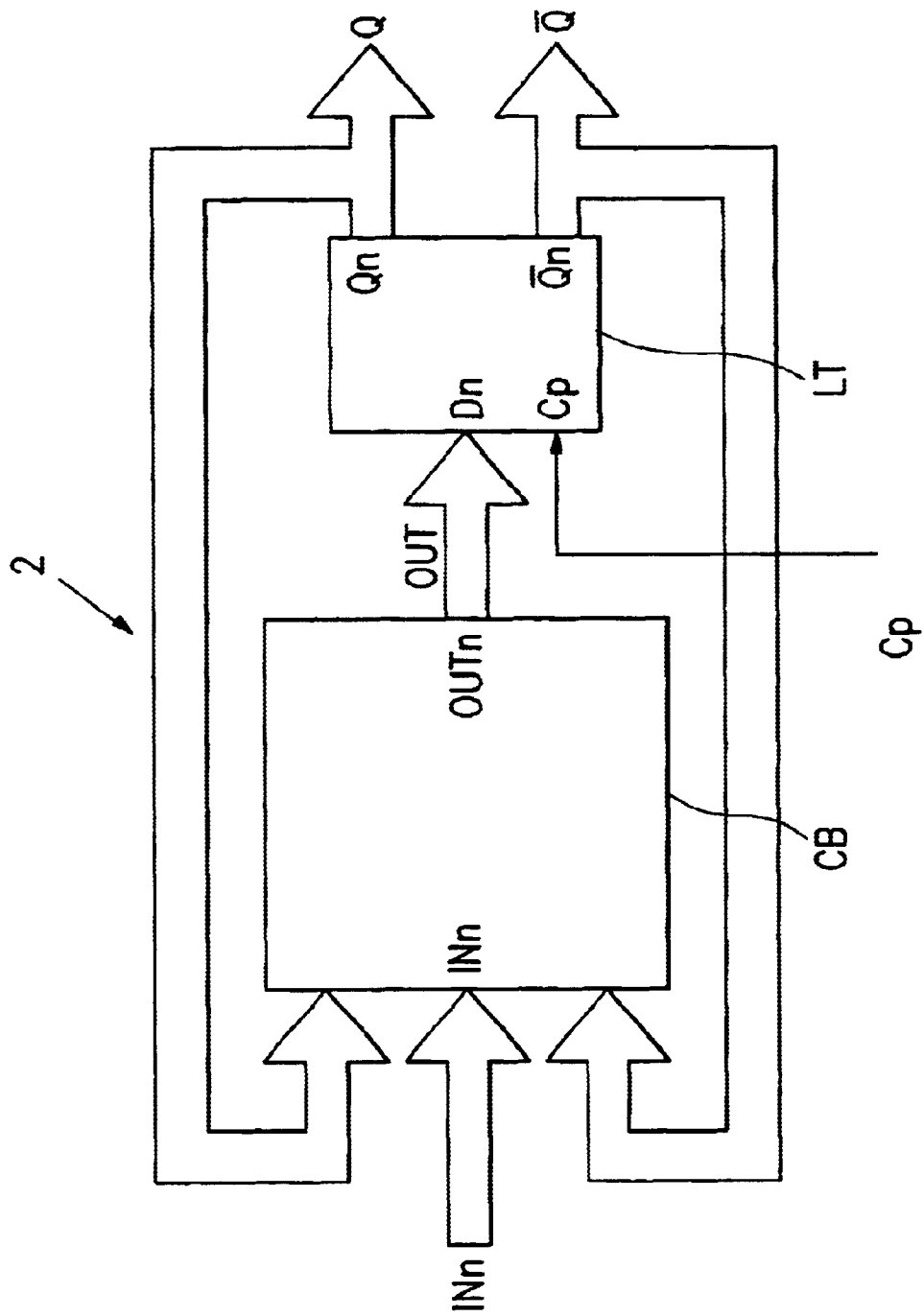
FIG. 12 is a block diagram illustrating a conventional logic processing circuit.

FIG. 11B shows a circuit diagram of the transistor NT in FIG. 11A. A gate electrode G is connected to the conductor layer 40. A source electrode S is connected to the source area 22 while a drain electrode D is connected to the drain area 24. This transistor NT is a transistor wherein the insulation layer of a normal MOSFET, which is normally a silicon oxide, is replaced by a ferroelectric material such as PZT. Accordingly, a nonvolatile memory device 70 can be obtained by changing only a part that comprises a conventional ferroelectric transistor used for SRAM, etc. In addition, the p-channel MOSFET transistor PT similarly structured as the transistor NT shown in FIG. 11A can also be used.

Moreover, the memory device using a ferroelectric material is not limited to those using a ferroelectric transistor. Ferroelectric capacitors, for example, can also be used. In the latter case, a ferroelectric capacitor instead of the ferroelectric transistor NT shown in FIG. 4 can be attached in series to a gate electrode of a regular MOSFET. When such compositions as described above are applied, a regular MOSFET conventionally used for a latch circuit can be used as is. In addition, a nonvolatile latch circuit can be obtained simply by adding a ferroelectric capacitor.

Furthermore, the memory device using a ferroelectric material is not limited to the above described circuits. The memory device using a ferroelectric material includes a memory device using a variety of ferroelectric materials described in Japanese Patent Application No. H10-315806 and No. H11-71733 by the inventor of the present patent application.

Furthermore, the nonvolatile memory device is not limited to memory device using a ferroelectric material. For example, a conventional nonvolatile element using EEPROM, etc. can also be used as a nonvolatile memory device. Moreover, the memory device is not limited to a nonvolatile memory device. A volatile memory device such as SRAM, for example, can also be used as a memory device.

Moreover, although according to the above embodiments, the amount of data in each data group is fixed to ensure that the time required for processing each data group is shorter than the time interval predicted for electric power supply becoming incomplete, the amount of data in the data group does not have to be so limited. The amount of data in the data group can be any amount that ensures that the time required for processing the data group is shorter than the time interval predicted for data processing becoming incomplete. The amount of the data group can also be fixed by optional standards.

Furthermore, according to the above described embodiments, the detection control device is configured to detect a success or failure result by detecting whether or not prescribed electric power is secured while the present data group is being processed by the process output device. However, the detection control device is not limited to this configuration. For example, the detection control device can be configured to perform the above detection process by detecting whether or not a received data is fragmented.

Also in the above described embodiments, the first data processor and the second data processor are configured to exchange data processing success or failure detection results of all data groups by sending or receiving the delimiter data that delimits all data groups or signals based on the delimiter data. However, sending or receiving the success or failure detection results between the first data processor and the second data processor is not limited to this configuration.

In the above embodiments, it has been assumed that the second data processor is a noncontact IC card (a local unit) and the first data processor is a host unit that non-contactly supplies an electric power to the IC card and processes non-contact data communications with the IC card. Nonetheless, the present invention is not limited to this setup. For example, the present invention can also be applied to data processing systems that include contact-type IC cards (local units) and host units that contactly supply electric power to these IC cards and contactly process data communications with these IC cards.

The scope of applying the data processing system related to the present invention is not limited to data processing systems that include an IC card but should also include highly noisy communications systems such as wireless communications generally and communications using deep sea floor cables. Furthermore, the present invention is not limited to the aforementioned applications, but is to include applications to all data processing systems, data processors, and data processing methods that are required to process a series of mutually related data.

It will be apparent to those skilled in the art that various modifications and variations can be made the data processing system of the present invention without departing from the spirit or scope of the inventions. Thus, it is intended that the present invention cover modifications and variations of this invention that come within the scope of the appended claims and their equivalents.

What is claimed is:

1. A data processing system for processing a plurality of successive groups of input data, comprising:

a process output for processing and outputting each group of input data;

a memory device connected to the process output circuit for storing processing results; and a detection control device for controlling the process output circuit and the memory device, wherein the detection control device performs a success/failure detection to detect whether a process of a present input data group is successful or unsuccessful, wherein when the detection control device detects a successful process, it controls the memory device to store the processing result of the present data group and controls the process output circuit to process the next input data group, wherein when the detection control device detects an unsuccessful process, it controls the memory device to output the processing results of the immediately previous data group as the output of the process output circuit and controls the process output circuit to reprocess the present data group, wherein the data processing system comprises a plurality of processing cells connected in series for sequentially processing input data, each processing cell having a process output circuit and a memory, wherein each process output circuit comprises a combinational circuit for processing the input data groups and a latch circuit for latching and outputting the processing results of the combinational circuit, wherein each memory device is connected to a corresponding latch circuit and exchanges data with the corresponding latch circuit under the control of the detection control device, wherein the process output circuit, the memory device and the detection control device form a second data processing device, the data processing system further comprising a first data processing device communicating with the second data processing device, the first data processing device demarcating the input data into a plurality of input data groups and sequentially transmitting the input data groups to the second data processing device, the first data processing device including a transmit control device, wherein the transmit control device receives the success/failure detection results from the detection control device, wherein when the detection control device detects a successful process, the transmit control device controls the first data processing device to transmit the next data group to the second data processing device, and when the detection control device detects an unsuccessful process, the transmit control device controls the first data processing device to retransmit the present data group to the second processing device, wherein the second data processing device receives an electric power supply from the first data processing device in a non-contact manner, wherein the memory device is a nonvolatile memory device, and wherein the detection control device performs the success/failure detection by detecting whether or not a predetermined electric power is received during a time period in which the present data group is processed by the process output device.

2. The data processing system of claim 1, wherein the first data processing device delimits the input data into the plurality of input data groups delimited by delimiting data, and transmits the input data groups with the delimiting data to the second data processing device, and wherein the second data processing device recognizes input data groups by recognizing the delimiting data.

3. The data processing system of claim 2, wherein when the success/failure detection result is successful, the detection control device returns a signal based on the delimiting data to the first data processing device, and wherein when the success/failure detection result is unsuccessful, the detection control device does not return a signal based on the delimiting data to the first data processing device, and wherein the transmit control device determines whether the success/failure detection result is successful based on whether or mo the signal based on the delimiting data has been returned by the detection control device.

4. The data processing system of claim 1, wherein the memory device uses a ferroelectric material.

5. The data processing system of claim 1, wherein each data group contains a fixed amount of data such that the amount of time required for processing the data group by the process output circuit is shorter than a predicted interval of the electric power supply becoming incomplete.

6. A data processor for communicating with another data processor, receiving an electric power in non-contact manner and sequentially receiving a plurality of successive data groups, comprising:

a plurality of processing cells connected in series for sequentially processing the data groups, each processing cell having a process output circuit and a nonvolatile memory device, the process output circuit composed of a combinational circuit for processing input data and a latch circuit for latching and outputting a processing result of the combinational circuit, the nonvolatile memory device connected to the corresponding latch circuit and exchanging data with the corresponding latch circuit; and a detection control device for controlling the plurality of processing cells;

wherein the detection control device performs a success/failure detection to detect whether or not a predetermined electric power is received during a time period in which a present data group is processed;

wherein when the detection control device performs a success detection, it controls the memory device to store the processing result of the present data group and controls the process output circuit to process the next data group;

and wherein the detection control device performs a failure detection, it controls the memory device to output the processing result of the immediately previous data group as the output of the process output circuit and controls the process output circuit to reprocess the present data group.

7. The data processor of claim 6, wherein the data processor recognizes a boundary of data groups by recognizing a delimiting data.

8. The data processor system of claim 7, wherein the second data processing device receives an electric power supply from the first data processing device in a non-contact manner, wherein the memory device is a nonvolatile memory device, and wherein the detection control device performs the success/failure detection by detecting whether or not a predetermined electric power is received during a time period in which the present data group is processed by the process output device.

9. The data processing system of claim 6, wherein the memory device uses a ferroelectric material.

10. The data processing system of claim 6, wherein each data group contains a fixed amount of data such that the amount of time required for processing the data group by the process output circuit is shorter than a predicted interval of the electric power supply becoming incomplete.

* * * * *